Sept. 9, 1958
A. L. GREER
2,851,274
INTERNAL EXPANSION COLLETS
Filed July 1, 1957
2 Sheets-Sheet 1
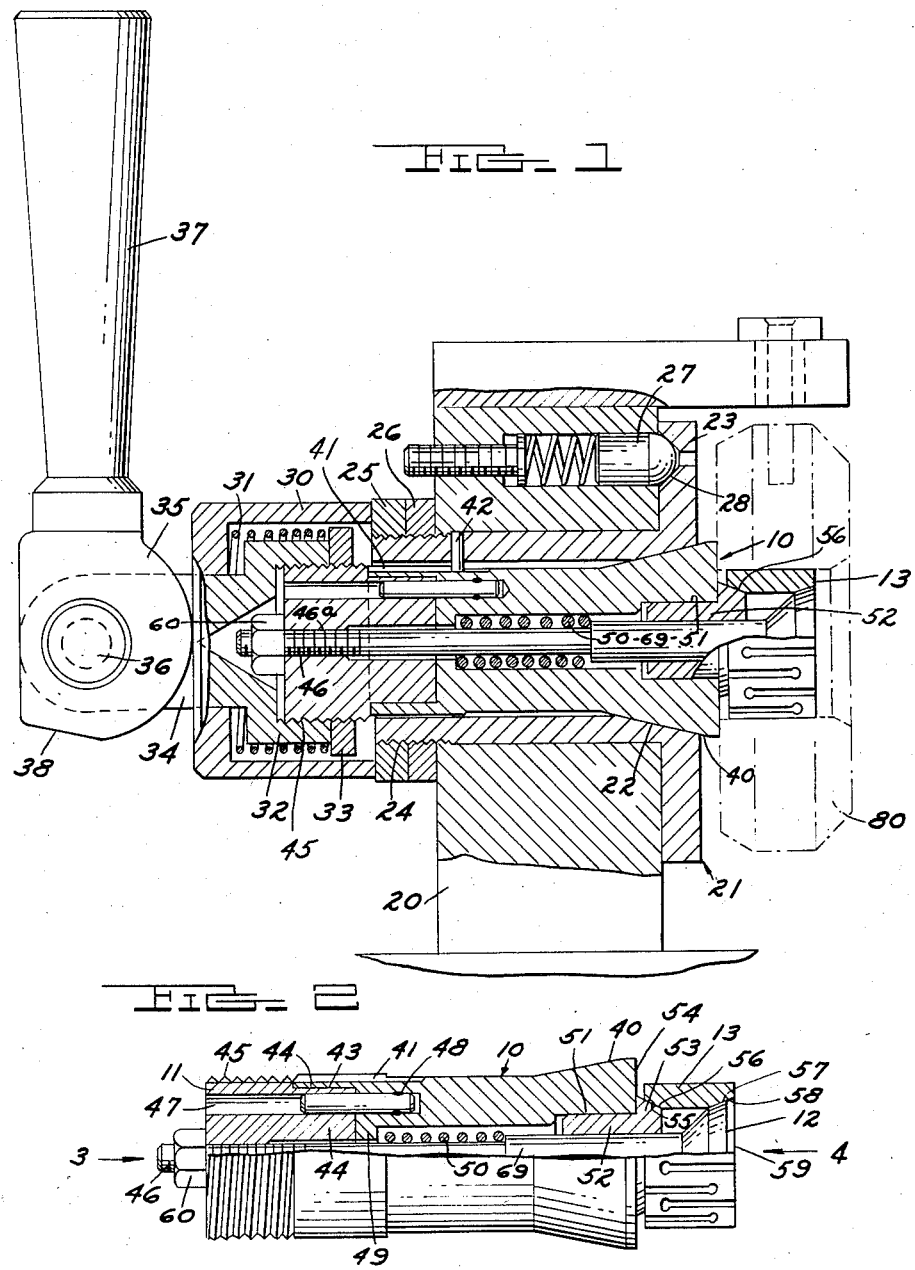
INVENTOR.
ALFRED L. GREER
BY
ATTORNEY Sept. 9, 1958  A. L. GREER  2,851,274
INTERNAL EXPANSION COLLETS
Filed July 1, 1957  2 Sheets-Sheet 2

INVENTOR.
ALFRED L. GREER
BY
ATTORNEY

United States Patent Office 2,851,274
Patented Sept. 9, 1958

2,851,274

INTERNAL EXPANSION COLLETS

Alfred L. Greer, Detroit, Mich.

Application July 1, 1957, Serial No. 669,335

7 Claims. (Cl. 279—2)

This invention relates to internal expansion collets and more particularly pertains to an expansion collet which is interchanged with the conventional contraction collet employed in conventional standard type machines and fixtures.

Internal expansion collets have been employed heretofore to facilitate the internal gripping of workpieces, however, the several devices of the prior art have not proven entirely satisfactory inasmuch as they are complicated in design and construction, expensive to manufacture, difficult to use, and require special adaptation and modification in the machines.

With the foregoing in view, the primary object of the invention is to provide an internal expansion collet which is simple in design and construction, inexpensive to manufacture, easy to use, and which does not necessitate modification or conversion adaptation of standard machines, and which can be used with standard machine draw bars and spindles.

An object of the invention is to provide a collet which is suitable for quick changing in the machine and that will insure true and concentric action in operation.

An object of the invention is to provide a collet assembly whereby the sleeve provides a radial abutment for properly locating the workpiece.

An object of the invention is to provide an internal expansion collet assembly which can be used with tapered, straight, or angular seating surfaces alike as far as the workpiece is concerned.

An object of the invention is to provide a spring seating arrangement for both ejecting the pull rod to the collet release position and also for retaining the collet sleeve in the machine spindle including means for adjusting the spring tension as desired.

An object of the invention is to provide paired collet seats on the collet ring having oppositely disposed angular surfaces for expanding the collet ring and which may be positioned at different angles of inclination.

An object of the invention is to provide a flat radial work contacting surface on the collet sleeve for abutting the workpiece to insure that the workpiece is correctly radially aligned and which aligns the workpiece in conjunction with the collet ring moving axially towards the surface to carry the workpiece into abutting relationship therewith in expanding the collet ring to grip the workpiece.

These and other objects of the invention will become apparent by reference to the following description of an internal expansion collet assembly embodying the invention taken in connection with the accompanying drawings in which:

Fig. 1 is a cross-sectional view of a machine fixture spindle with the inventive collet associated therewith in conjunction with manual collet operating means.

Fig. 2 is a side-elevational view of the inventive collet assembly partly in cross section seen in Figs. 1 and 5.

Figure 5:
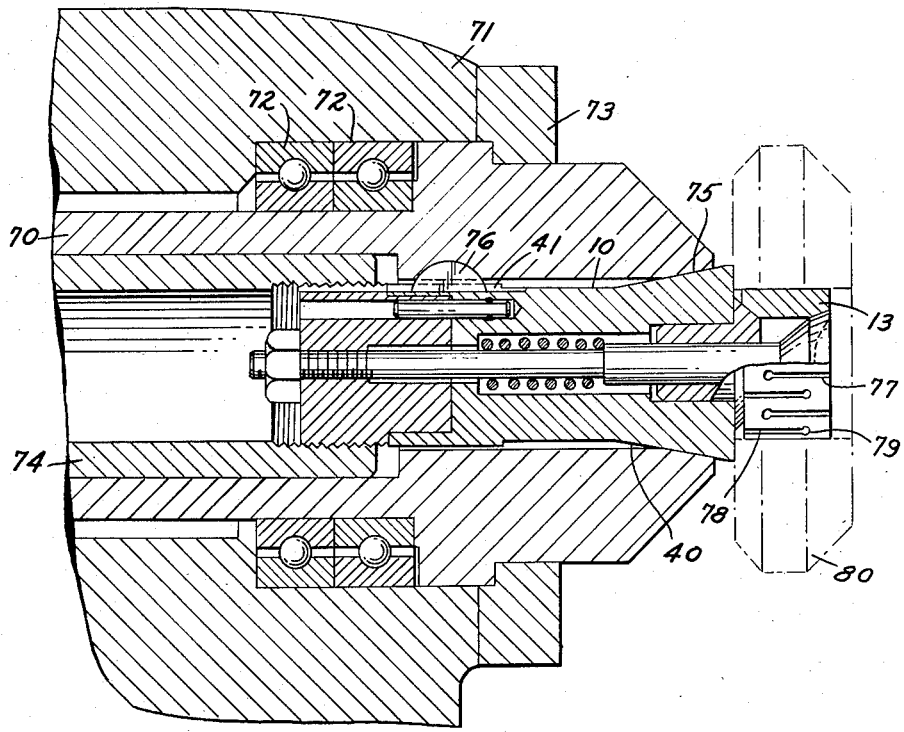
Fig. 5 is a view similar to Fig. 1 showing the device associated with a machine operated draw bar.
Figure 3:
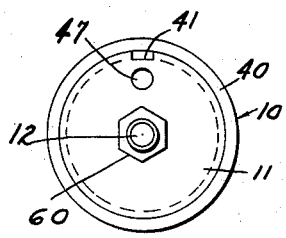
Fig. 3 is a rear end elevational view of the device seen in Fig. 2.
Figure 4:
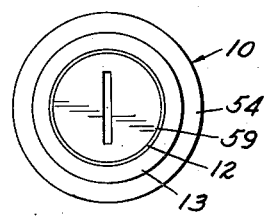
Fig. 4 is a front end elevational view of the device seen in Fig. 2.

Referring now to the drawings wherein like numerals refer to like and corresponding parts throughout the several views, the internal expansion collet disclosed therein to illustrate the invention comprises a sleeve 10 for insertion in a fixture or machine spindle, a nut 11 for connecting to the draw bar, a pull rod 12 connected to the nut 11 for actuation by the draw bar in conjunction with axial movement of the nut 11 and a slotted collet ring 13 for internally gripping a workpiece located thereon.

More particularly a machine fixture or stand 20, such as a grinder attachment, is equipped with a spindle 21 having a tapered socket 22 for gripping the collet sleeve, and as illustrated, the spindle 21 is equipped with a face flange 23 and a threaded end 24 on which the lock nuts 25 and 26 are positioned for holding the spindle 21 in the fixture stand 20; the spring pressed detent 27 is adapted to cooperate with recesses 28 in the face plate 23 for indexing the workpiece as desired such as in grinding gear teeth. The draw bar shell 30 abuts the lock nut 25 and houses the spring 31, threaded head 32, and lock nut 33 which are fixed on the collet nut 11 and the head 32 is provided with an extending tang 34 which is pivotally connected as at 36 to the bifurcated cam 35; the cam 35 is manually turnable by the handle 37 to place the cam 35 in engagement with the shell 30 to withdraw the head 32 and attached collet nut 11 and to move the flat 38 adjacent the shell 30 to permit the spring 31 to return the element 32 to relieve the tension on the collet nut 11.

The collet sleeve 10 spindle cooperating portion such as the tapered portion 40 connects with the tapered portion 22 of the spindle 21 and is equipped with a longitudinal groove 41 for receiving the key 42 set in the machine spindle 21 so as to insure that no relative rotation occurs between the machine spindle and the collet sleeve 10 particularly during adjustment and machining operations; the sleeve 10 has a rear counterbore 43 and the nut 11 has a smooth cylindrical projecting portion 44 disposed in the counterbore 43 and abutting the inner end of the sleeve 10 while the nut 11 has an externally threaded portion 45 for engaging the threaded draw bar head 32 and an internally threaded portion 46A for engaging the threaded end 46 of the pull rod 12; the nut 11 is also equipped with a torque pin receiving longitudinal aperture 47 for receiving the torque pin 48 which is fixed in the sleeve 10 so as to prevent relative rotation between the nut 11 and the sleeve 10 and to permit relative axial movement. The sleeve 10 is also provided with an internal flange 49 which abuts the nut cylindrical portion 44 on one side and the spring 50 on the other side which spring surrounds the pull rod 12 and abuts the shoulder 69 on the pull rod 12. The sleeve liner 52 is press fitted into the sleeve counterbore 51 and is equipped with a radial external flange 53 which abuts the flat radial face surface 54 on the sleeve 10; the flange 53 has an externally angled area 55 including axially outwardly and radially inwardly at approximately 20° to the axis of the sleeve which co-acts with the slotted self-contractable force-expandable collet ring 13 which has a complementary internal beveled area 56 for expanding one side of the collet ring 13 and for providing a reaction point for the pull rod 12.

The ring 13 adjacent its outer side is equipped with an axially and radially inwardly angled beveled area to the axis of the sleeve which co-acts with a complementary angled beveled area 58 on the puller rod 12 and it is to be noted that the puller rod 12 extends from its beveled head portion 59 through the liner 53, spring 50, flange 49, and is threaded in the nut 11 and projects therebeyond for the purpose of engaging the lock nut 60.

Referring to the device of Fig. 6 which embodies a rotating spindle 70 bearinged in the housing 71 on the anti-friction bearings 72 and held in position by the face plate 73, the machine actuated draw bar 74 is concentrically disposed within the rear of the spindles 70 and the inventive collet assembly is seated in the tapered receiver portion 75 of the spindle with the nut 11 in threaded engagement with the draw bar 74 with the Woodruff key 76 in the spindle 70 and in the key way 41 of the sleeve 10.

The collet ring is alternately slotted from either side by the slots 77 and 78 which terminate in enlarged arcs 79 to assist in the expansion and contraction of the ring 13.

In operation the inventive collet device is assembled as hereinbefore described and the size of the ring 13 is adjusted to the internal size of the part to be mounted thereon and the compression of the spring 50 is adjusted by turning the nut 11 relative to the threaded end 46 of the puller rod 12 and it is to be noted in the devices of Figs. 1 and 5 that the collet nut 11 is held by the draw bar, and that the spring 50 urges the sleeve tapered portion 40 into frictional engagement with the spindle tape portion 22 or 75 as well as extends the puller rod tapered head 59 in desired pressure engagement with the collet ring 13 so as to maintain the collet ring 13 inner beveled surface against the beveled surface of the sleeve liner flange 53. It is to be understood that various size sleeve liner flanges, puller rod heads, and collet rings can be stocked in to suit various sizes of workpieces.

In operation of the device of Fig. 1, the handle 37 is placed in the downward release position permitting the collet ring 13 to contract and the workpiece 80 is placed thereon with its internal side abutting the face 54 of the sleeve 10; the handle 37 is then moved to the upward position as seen in Fig. 1 whereby the tang 34, head 32, and nut 11 is connected to the puller rod 12 head 59 against the collet ring 13 to move the collet ring 13 both axially to the left as seen in the drawing in conjunction with expanding radial movement so that as the collet ring first contacts the workpiece interior it moves the workpiece into forced engagement with the flat radial face 54 whereby further inward axial movement is prevented and upon continued inward movement of the puller rod 12 the collet ring 13 is reacted against the sleeve liner 53 and the puller rod head 59 to expand radially within the part 80 to firmly fix the part on the collet ring and it is obvious that the threaded relationship between the puller rod end 46 and the nut 11 can be utilized for adjusting the amount of inward axial movement of the head 12 as desired.

Upon the machining or grinding of the workpiece 80 the handle 37 is placed in the downward release position thereby allowing the head 32 and the nut 11 attached thereto to move to the right as seen in the drawing to permit the spring 50 to eject the puller rod outwardly to the right as seen in the drawing to assist the collet ring in its spring-action tendency to force the puller rod head 14 outwardly to permit the spring-action of the collet ring to contract to release the workpiece for removal by the workman.

The operation of the device as seen in Fig. 5 is substantially similar to that of Fig. 1 except as to the machine draw bar 74 which may be hydraulically or mechanically operated to actuate the nut 11 and puller rod 12 to expand and contract the collet ring 13 within the workpiece 80. In machining the workpiece 80 such as by turning, it is to be noted that the drive of the machine spindle 70 is transmitted via the Woodruff key to the sleeve 10 and through the torque pin 48 to the nut 11 which is locked on the puller rod 12 so that drive is transmitted to the puller rod head 59 on one edge of the ring 13 as well as drive being communicated to the other inner edge of the ring 13 via the tapered spindle 70, the sleeve taper 40, the press fitted sleeve liner 52, and beveled flange 53 so that no twisting tortuous forces are communicated to the ring 13 due to the fact that it is driven on both sides.

The inventive internally expanding collet with these features constitutes a compact, durable, neat appearing, and adjustable mechanism easily operated to internally grip workpieces and for rapidly accurately mounting workpieces thereon automatically without the necessity of laborious adjustments and time consuming checks.

Although but a single embodiment of the inventive collet has been shown and described in detail in conjunction with two machine elements, it is obvious that many changes may be made in the size, shape, detail, and arrangement of the various elements of the invention within the scope of the appended claims.

I claim:

1. An internal expansion type collet combination insertable in a machine or fixture spindle comprising a tapered sleeve for frictionally engaging a machine spindle socket, an axially sliding key connection between said sleeve and the spindle remote from said tapered engagement to prevent twisting and other relative rotational movement between said spindle socket and said sleeve such as during adjustment; said sleeve having a rear counterbore; a nut having a smooth cylindrical portion disposed in said sleeve rear counterbore, an extending externally threaded portion for engaging a machine fixture draw bar, an internally threaded portion for engaging a collet puller rod, and a torque pin receiving aperture; a torque pin fixed on said sleeve disposed in said nut aperture preventing relative rotation between said sleeve and said nut; said sleeve having an internal radial flange adjacent said nut; a spring disposed in said sleeve against said flange oppositely to said nut; said sleeve having a front counterbore; a sleeve liner press fitted in said sleeve front counterbore having a sleeve face contacting radial flange equipped with an externally beveled annular area angling axially outwardly and radially inwardly at approximately 20° to the axis of said sleeve, a slotted self-contractable force-expandable slotted collet ring having a complementary internal beveled annular area slidably abutting said linear beveled annular area adjacent the inside side of said ring and an axially and radially inwardly beveled area at the outside of said ring at approximately 20 degrees to the axis of said sleeve; a puller rod axially slidably disposed in said liner, sleeve, spring, and having a threaded end threaded in said nut internal threads, a flange abutting said spring, and a head equipped with an annular beveled area complementary to and internally contacting said collet ring outside beveled area, and a lock nut on said rod threaded end bearing against said nut; said sleeve having a flat radial portion concentrically outside said liner flange for contacting and radially aligning a workpiece side; said collet ring being expandable to grip a workpiece internally by camming the confined beveled areas of said ring between said beveled areas of said liner flange and said head by pulling said head axially inwardly of said sleeve via said rod and nut by the action of a draw bar threaded on said nut external threads; said collet ring being contractable by moving said head axially outwardly of said ring whereby said ring is released at its outside to contract so that said ring self contracts at its inside and moves axially outwardly and radially inwardly down said liner beveled area; said spring being so positioned to urge said sleeve into said spindle and to move said head outwardly of said collet ring; and means preventing relative rotation between said nut and said puller rod to maintain their relative axially adjusted position.

2. An internal expansion type collet combination insertable in a machine or fixture spindle comprising a sleeve for engaging said machine spindle, key connection between said sleeve and said socket to prevent relative rotational movement between said socket and said sleeve; a nut abutting said sleeve having an externally threaded portion for engaging a draw bar, an internally threaded portion for engaging a collet puller rod, and a torque pin receiving aperture; a torque pin fixed on said sleeve disposed in said nut aperture permitting relative axial movement and preventing relative rotation between said sleeve and said nut; said sleeve having an internal flange; a spring disposed in said sleeve against said flange oppositely to said nut; said sleeve having a flat radial face and a projecting beveled annular area extending axially outwardly and radially inwardly to the axis of said sleeve, a slotted self-contractable force-expandable collet ring having a complementary internal beveled annular area slidably abutting said sleeve beveled annular area adjacent the inside side of said ring and an axially and radially inwardly beveled area at the outside of said ring to the axis of said sleeve; a puller rod axially slidably disposed in said sleeve, flange, and spring and having a threaded end threaded in said nut internal threads; a flange abutting said spring and a head equipped with an annular beveled area complementary to and internally contacting said collet ring outside beveled area; said sleeve having a flat radial face portion outside said beveled projecting portion for contacting and radially aligning a workpiece side thereagainst; said ring being expandable to grip a workpiece by camming the confined beveled areas of said ring between said beveled areas of said sleeve and said head by pulling said head inwardly of said sleeve via said rod and nut by the action of a draw bar threaded on said nut external threads; said spring being so positioned to urge said sleeve inwardly of a spindle to hold said sleeve in a spindle and to move said head outwardly of said collet ring upon draw bar outward movement.

3. An internal expansion collet combination for quick insertion and removal from a spindle socket comprising a sleeve for engaging a spindle socket having inner and outer ends, a nut abutting said sleeve inner end having an externally threaded portion for engaging a draw bar, an internally threaded portion for engaging a collet puller rod, and a torque pin receiving aperture; a torque pin fixed on said sleeve disposed in said nut aperture permitting relative axial movement and preventing relative rotation between said sleeve and said nut; said sleeve having an internal flange; a spring disposed in said sleeve against said flange oppositely to said nut; said sleeve outer end having a concentrically outer flat radial face and a concentrically inner beveled annular area angling axially outwardly and radially inwardly to the axis of said sleeve, a slotted self-contractable force-expandable collet ring having a complementary internal beveled annular area slidably abutting said sleeve beveled area adjacent the inside side of said ring and an axially and radially inwardly angling beveled area at the outside of said ring to the axis of said sleeve; a puller rod axially slidably disposed in said sleeve and spring and having a threaded end threaded in said nut internal threads, a head equipped with an annular beveled area complementary to and internally contacting said collet ring outside beveled area and a flange abutting said spring; said sleeve flat radial face portion being adapted to contact and radially aligning a workpiece side; said ring being expandable to grip a workpiece by camming the confined beveled areas of said ring between said beveled areas of said sleeve and said head by pulling said head toward said sleeve via said rod and nut by the action of a draw bar threaded on said nut external threads; said puller rod threaded end projecting axially outwardly beyond said nut; and a lock nut threaded on said puller rod projecting threaded end abutting said nut to lock said nut and said puller rod against relative rotation to maintain their axially adjusted relative position.

4. An internal expansion collet comprising a slotted expanding collet ring for gripping a part internally, oppositely disposed axially and radially inwardly inclined annular cam edges on said ring, a sleeve having an outer end equipped with an annular projecting beveled collar mating with and abutting one said ring cam edge, a head having an annular beveled surface mating with and abutting the other said ring cam edge; said ring being camwise confined between said collar and said head; a puller rod on said head extending through said ring and sleeve terminating in a threaded end extending beyond said sleeve, a shoulder on said rod in the area of said sleeve, an internal flange in said sleeve spaced from said shoulder, a spring disposed around said rod between and abutting said sleeve flange and rod shoulder, and a nut having internal and external threads; said nut internal threads being screwed on said rod; said nut external threads being connectable to a draw bar whereby movement of a draw bar in one direction withdraws said head to expand said collet to grip a workpiece and movement of a draw bar in the opposite direction moves said head outwardly of said ring to contact said ring to release a workpiece; said nut being axially variably positionable on said rod for adjusting the compression of said head against said ring; said nut being axially variably positionable on said rod for adjusting the compression of said spring for exerting holding pressure of said sleeve relative to a spindle; said puller rod threaded end projecting axially outwardly beyond said nut; and a lock nut threaded on said puller rod projecting threaded end abutting said nut to lock said nut and said puller rod against relative rotation to maintain their axially adjusted relative position.

5. An internal expansion collet comprising a slotted expanding collet ring for gripping a part internally, oppositely disposed axially and radially inwardly inclined annular cam edges on said ring, a sleeve having an outer end equipped with an annular projecting beveled collar mating with and abutting one said ring cam edge, a head having an annular beveled surface mating with and abutting the other said ring cam edge; said ring being camwise confined between said collar and said head; a puller rod on said head extending through said ring and sleeve terminating in a threaded end extending beyond said sleeve, a shoulder on said rod in the area of said sleeve, an internal flange in said sleeve spaced from said shoulder, a spring disposed around said rod between and abutting said sleeve flange and rod shoulder, a nut having internal and external threads; said nut internal threads being screwed on said rod; said nut external threads being connectable to a draw bar whereby movement of a draw bar in one direction withdraws said head to expand said collet to grip a workpiece and movement of a draw bar in the opposite direction moves said head outwardly of said ring to contact said ring to release a workpiece; said rod being axially variably positionable in said nut for adjusting the compression of said head against said ring; said nut being axially variably positionable on said rod for adjusting the compression of said spring for exerting holding pressure of said sleeve relative to a spindle, and a torque pin sliding connection between said sleeve and nut permitting axial movement and preventing relative rotational movement therebetween.

6. An internal expansion collet comprising a slotted expanding collet ring for gripping a part internally, oppositely disposed axially and radially inwardly inclined annular cam edges on said ring, a sleeve having an outer end equipped with an annular projecting beveled collar mating with and abutting one said ring cam edge, a head having an annular beveled surface mating with and abutting the other said ring cam edge; said ring being camwise confined between said collar and said head; a puller rod on said head extending through said ring and sleeve terminating in a threaded end extending beyond said sleeve and a nut having internal and external threads; said nut internal threads being screwed on said rod; said nut external threads being connectable to a draw bar whereby movement of a draw bar in one direction withdraws said head to expand said collet to grip a workpiece and movement of a draw bar in the opposite direction moves said head outwardly of said ring to contact said ring to release a workpiece; said nut being axially variably positionable on said rod for adjusting the compression of said head against said ring; said puller rod threaded end projecting axially outwardly beyond said nut; and a lock nut threaded on said puller rod projecting threaded end abutting said nut to lock said nut and said puller rod against relative rotation to maintain their axially adjusted relative position.

7. An internal expansion collet comprising a slotted expanding collet ring for gripping a part internally, oppositely disposed axially and radially inwardly inclined cam annular edges on said ring, a sleeve having an outer end equipped with an annular projecting beveled collar mating with and abutting one said ring edge, a head having an annular beveled surface mating with and abutting the other said ring edge; said ring being cam-wise confined between said collar and said head; a puller rod on said head extending through said ring and sleeve terminating in a threaded end extending beyond said sleeve, a nut having internal and external threads; said nut internal threads being screwed on said rod; said nut external threads being connectable to a draw bar whereby movement of a draw bar in one direction withdraws said head to expand said collet to grip a workpiece and movement of a draw bar in the opposite direction moves said head outwardly of said ring to contact said ring to release a workpiece; said rod being axially variably positionable in said nut for adjusting the compression of said head against said ring; and a torque pin fixed on said sleeve slidably disposed in said nut permitting relative axial movement and preventing relative rotational movement therebetween; said puller rod threaded end projecting axially outwardly beyond said nut; and a lock nut threaded on said puller rod projecting threaded end abutting said nut to lock said nut and said puller rod against relative rotation to maintain their axially adjusted relative position.

References Cited in the file of this patent

UNITED STATES PATENTS

| | | |
|---|---|---|
| 2,494,899 | Ross | Jan. 17, 1950 |
| 2,732,213 | Drew | Jan. 24, 1956 |
| 2,789,825 | Drew | Apr. 23, 1957 |